Nov. 15, 1960     N. B. HENRY     2,959,863
LAP INDICATOR

Filed Sept. 2, 1958     2 Sheets-Sheet 1

*INVENTOR:*
NELSON B. HENRY

BY

ATTORNEY

Nov. 15, 1960  N. B. HENRY  2,959,863
LAP INDICATOR

Filed Sept. 2, 1958  2 Sheets-Sheet 2

INVENTOR:
NELSON B. HENRY

BY

ATTORNEY ps://www.w3.org/1998/Math/MathML"
United States Patent Office 2,959,863
Patented Nov. 15, 1960

2,959,863
LAP INDICATOR

Nelson B. Henry, Decatur, Ga., assignor to Aldrich Machine Works, Greenwood, S.C., a corporation of South Carolina Filed Sept. 2, 1958, Ser. No. 758,448

7 Claims. (Cl. 33—147)

This invention relates to a lap indicator, and more particularly concerns a mechanism readily applicable to conventional calendering machines for indicating the uniformity and thickness of a lap or web of textile fibers passing through the calendering rollers.

It is highly desirable in the production of various natural and synthetic fabrics to obtain a web of substantially constant thickness and uniformity. To this end, it is now conventional practice to make suitable weight and thickness determinations on the lap after the calendering operation has been completed. Where it is found in the usual yard-by-yard test that allowable tolerances have been exceeded, it is general practice to reject such lap and return it for reworking. It will be recognized that such conventional methods are not only time consuming and tedious but result in considerable waste since they fail to permit rapid detection or correction of undesirable thickness and uniformity conditions.

One of the objects of this invention, therefore, is to overcome these and many other problems known to the prior art by the provision of a new and improved lap indicator for calendering machines which affords a visual indication of the yard-by-yard and side-to-side characteristics of a web of material passing therethrough so as to permit rapid detection and correction of variations beyond the prescribed range.

Another object of this invention is to provide a new and improved lap indicator for calendering machines which continuously indicates the average uniformity and thickness of a web of material passing through the calendering rollers so as to avoid subsequent tedious operations necessary to obtain such required information.

A further object of this invention is to provide a new and improved lap indicator for calendering machines which is simple in construction and operation and which is well adapted to meet the demands of economic manufacture.

Many other features, objects and adavntages of the present invention will become apparent from consideration of the following specification taken in conjunction with the accompanying drawings, in which like designators refer to the same or similar parts throughout, and in which.

Figure 1:
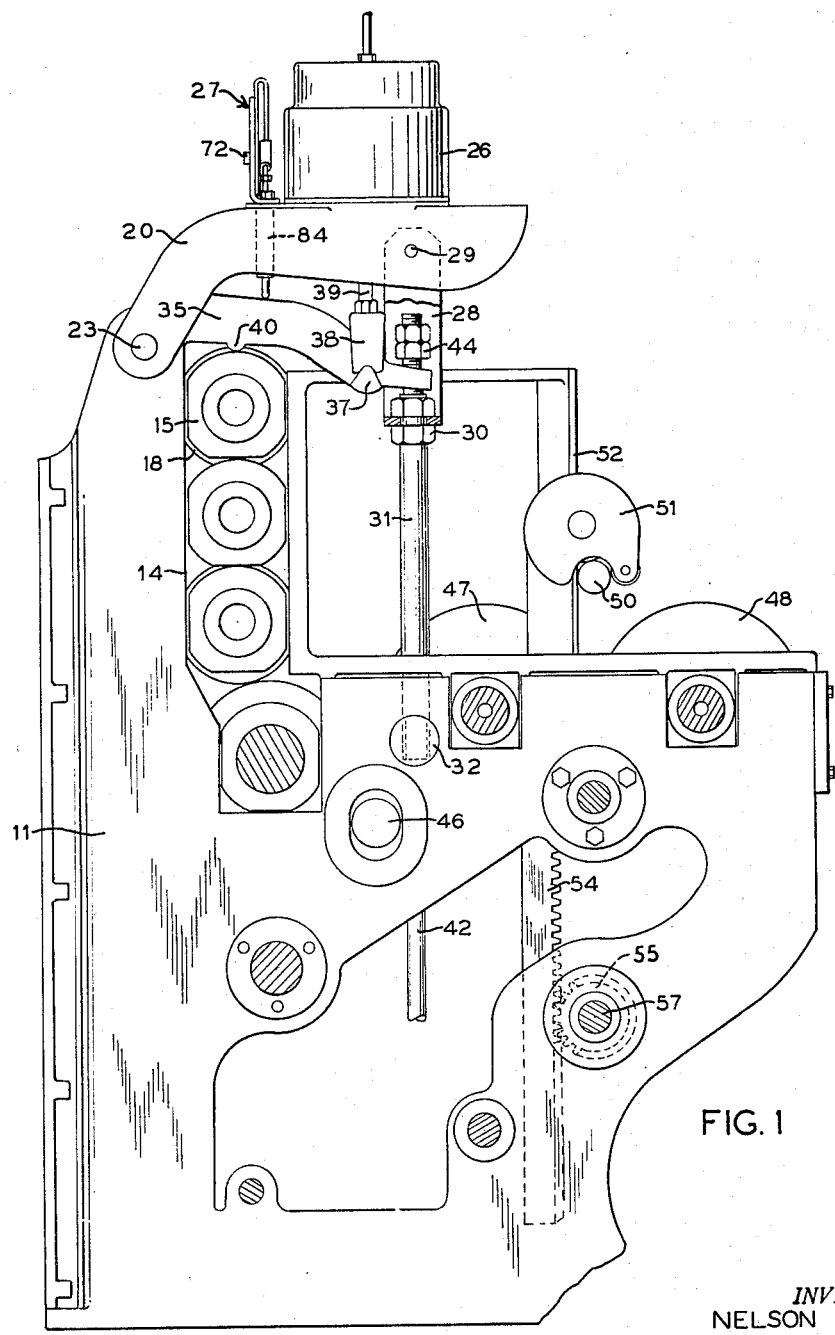
Fig. 1 is a side elevation, partly broken away, of a conventional calendering machine having a lap indicator thereon according to the present invention.
Figure 2:
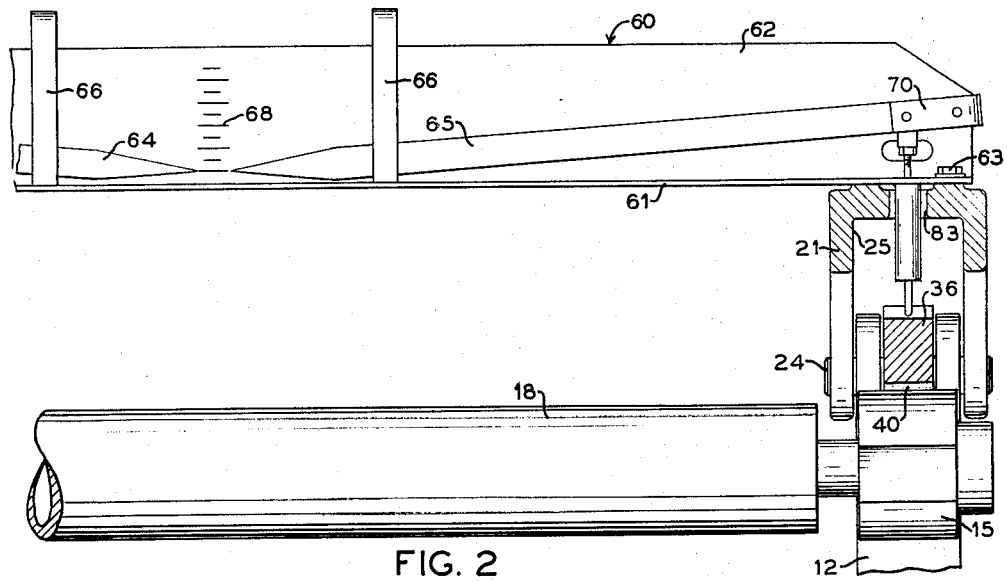
Fig. 2 is a detail vertical cross section, partly broken away, showing the construction of the indicator and its relation with the calendering roller support bearings.

Referring now more particularly to Figs. 1 and 2, that form of the invention therein shown by way of example may be characterized as in combination with a generally conventional calendering machine having side frames 11 and 12, each being formed with a substantially vertical channel 14 that is adapted to slidably guide therein the end support bearings 15 of a plurality of calendar rollers, as at 18, which extend transversely between side frames 11 and 12. Rollers 18 are suitably geared together so that each drives the one above in an opposite direction, the gearing being such that the rollers may be substantially spaced by material passing in a serpentine manner therebetween without disengaging the drive gearing. A pair of forwardly extending overhead support arms 20 and 21 are pivotally secured to the side frames 11 and 12, respectively, at the rearward upper ends thereof as by cross pins 23 and 24. Each support arm is of inverted, U-shaped cross section so as to permit partial straddling of its respective side frame, as seen more clearly at 25 in Fig. 2, whereby reception of the cross pin therethrough permits limited pivotal movement of the support arm. Mounted on each support arm is a pressure cylinder 26 and, rearwardly thereof, one part of the indicator assembly generally indicated at 27, to be hereinafter described in detail.

Adjustably positioning each overhead support arm is a U-shaped bracing yoke 28 having the sides thereof pivotally secured to the overhead support arm, as by pin 29, and the lower base thereof adjustably bolted, as at 30, to the upper end of tube 31 which extends downwardly for securement in cross shaft 32, the latter being pivotally mounted in side frame 11. Pivoted on the cross pins 23 and 24 are a pair of calender pressure levers 35 and 36 extending forwardly under the support arms, the arrangement being such that the upper rearward end of each side frame is bifurcated so as to guidably receive one of the pressure levers therein. Each lever is formed adjacent the free end thereof with an offset fulcrum 37 which is adapted to pivotally abut the force head 38 on the end of plunger 39 extending through overhead support arm 21 from pressure cylinder 26, the arrangement being such that downward movement of cylinder plunger 39 effects a pivotal action of the pressure lever about cross pin 23 so as to effect a downward pressure on the upper calender roller bearing 15, as by boss 40 on the underside of lever 35. Such pressure is transmitted through the bearings downwardly so as to force the calender rollers closer together and, in this manner, effect calendering of web passing therethrough in a conventional manner. It will be understood, of course, that the apparatus for maintaining pressure on the calender rollers could include a weight or spring rather than the pressure cylinder arrangement shown.

Referring now more particularly to one side of the machine, it being understood that the other side is substantially the same, the free end of pressure lever 35 is apertured for loose reception therethrough of rod 42 which has threaded thereto, at its upper end, the adjustable stop nut arrangement 44. Rod 42 extends downwardly through tube 31 and tube supporting cross shaft 32 for coupling to an automatic stopping mechanism (not shown) that disengages the calender roller drive upon such upward movement of pressure lever 35 that would cause the free end thereof to abut stop nut arrangement 44 and thereby raise rod 42. Such disengagement of the drive is effected by movement of the drive gears on the other side of the machine out of mesh, the driving pinion of such gears being secured to the other end of drop shaft 46 which extends between frames 11 and 12, all of which is well known in the art.

After the web of material passes from the calendering rollers, it moves across the lap rollers 47 and 48, which are rotating in a clockwise direction, for lapping or rolling on lap pin 50. As is well understood by those skilled in the art, pressure is maintained on the web as it is being lapped by a pair of spaced loggerheads, such as loggerhead 51 which rides in side frame track 52, the arrangement being such that loggerhead 51 is adapted to be actuated by a suitable pressure device (not shown). Depending from loggerhead 51 is a calender rack 54 that passes downwardly adjacent its respective side frame to actuate a pinion 55. To maintain the loggerheads equally extended at all times, the spaced loggerhead pinions, such as pinion 55, are keyed to a common supporting shaft 57 which is mounted in side frames 11 and 12.

Figure 3:
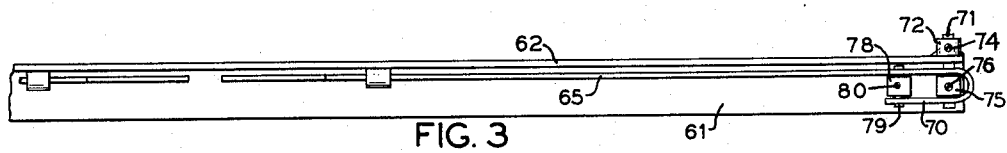
Fig. 3 is an enlarged top plan view of the indicator shown in Fig. 2.
Figure 4:
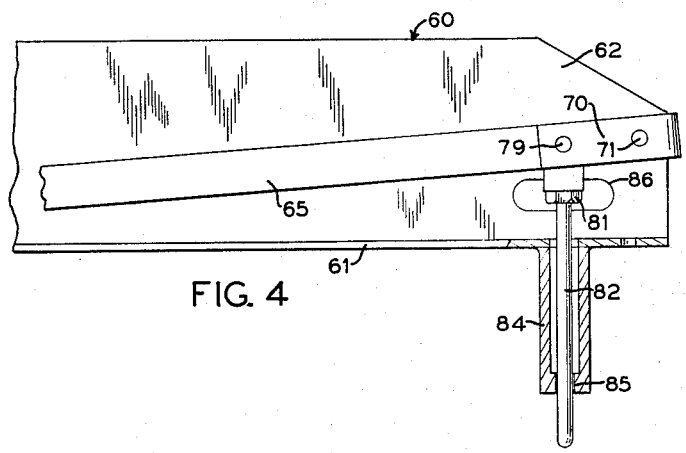
Fig. 4 is an enlarged detail, partly in section, showing the rod support arrangement of the lap indicator of the present invention.

Referring now more particularly to the structural arrangement of the indicator as shown more clearly in Figs. 2, 3 and 4, mounted between overhead support arms 21 and 22 is a transverse beam 60 of L-shaped cross section, having an upright backwall 62 and a base flange 61 which is bolted at its outer ends to the support arms, as at 63. Pivoted to backwall 62 at each end thereof are the elongate confronting indicator arms 64 and 65, each being adapted to ride inside one of the inverted U-shaped guides 66 that is welded or otherwise suitably attached to backwall 62 outwardly from the center thereof. Backwall 62 of beam 60 is centrally provided with vertical scale 68, with the pointers or tapered ends of the indicator arms being adapted for movement on opposite sides of the scale so as to permit the relation of the pointers to the scale to be readily viewed by an operator.

Referring now to one side of the indicator assembly, it being understood that the other side is identical, it can be seen that pivotal movement of indicator arm 65 is provided for by having the outer end of the main arm formed with a return-bent finger 70, both of which are journaled on pintle 71 that extends forwardly normal to backwall 62. Pintle 71 passes through backwall 62 into collar 72 which is welded to the rear side of backwall 62 and which secures pintle 71 therein by set screw 74. Maintaining indicator arm 65 in position for free rotatable movement on pintle 71 is collar 75 which is fitted on the pintle between the outer end of the main portion of arm 65 and its return-bent finger 70, the arrangement being such that the set screw 76 secures collar 75 to pintle 71 in such axial position thereon as to maintain the indicator arm free of the backwall 62 throughout its pivotal range. Inwardly of pintle 71, a crosshead 78 is pivotally secured between the outer end of the main portion of indicator arm 65 and its return-bent finger 70 as by pin 79 passing therethrough, with crosshead 78 being centered thereon by set screw 80. Threaded into the underside of crosshead 78 and adjustably secured therein by nut 81 is the rod 82 which extends downwardly through an aperture 83 in overhead support arm 21 so as to ride on the upper surface of calender pressure lever 36, the arrangement being such that the rod is guided and maintained in position by cylindrical guide 84 which is welded in depending manner to the base flange 61 of beam 60. Guide 84 is provided with an aperture 85 at the lower end thereof through which rod 82 slidably passes, and is enlarged as by counterboring thereabove to allow rod 82 to have a slight component of radial movement therein as crosshead 78 pivots about pin 79 in translating the motion of pressure lever 36 to indicator arm 65. Aperture 86 is provided in backwall 62 of beam 60 for insertion of a wrench therethrough so as to permit axial adjustment of rod 82.

As can be seen most clearly from Fig. 2, upward vertical movement of roller end bearing 15 pivots pressure lever 36 so as to drive rod 82 upwardly in guide 84. Since the upper end of rod 82 is secured in crosshead 78 which is pivoted to indicator arm 65, such movement of rod 82 causes indicator arm 65 to pivot about beam supported pintle 71, the arrangement being such that a small upward movement of end bearing 15 results in a relatively large movement of the pointer end of the indicator arm. In like manner, as lever 36 pivots downwardly, rod 82 follows therewith so as to permit indicator arm 65 to return by its own weight, being restrained only by rod 82 abutting lever 36. By way of example, it has been found that a suitable ratio of bearing to pointer movement for calendering operations on webs of cotton fibers is 24 to 1, but it is not intended, of course, that the invention should be limited to any particular movement ratio.

In application of the present invention, it will be understood by those skilled in the art that the indicator arrangement hereinabove described need not necessarily be secured to the overhead support arms, as shown, but may be mounted across any frame members which are relatively fixed with respect to the calender pressure levers or other mechanism moving therewith.

Considering the overall operation of the foregoing structure, it can be seen that with a predetermined thickness of lap passing through the calender rollers, the indicator arms from each end of the machine will point to a particular indicium on the scale. Once the operator has determined the ideal setting for lap thickness, he can thereafter maintain a vigil on the relationship of the pointers with that particular scale indicium. Upon a change in total thickness as by both pointers moving either upwardly or downwardly, the operator can make the proper corrections in the processing section prior to the calendering machine. In like manner, if either pointer moves away from the proper scale indicium so as to indicate that the lap is thicker at one side than the other, suitable correction can be made in the preceding section. In this manner, the operator is able to obtain a constant yard-by-yard and side-to-side indication of the thickness and uniformity of the lap, so as to permit both rapid detection and correction of lap conditions beyond the prescribed tolerance range for the particular lap being processed.

From the foregoing it will be apparent that I have provided a new and improved lap indicator which is well adapted to fulfill the aforestated objects of the invention. Moreover, whereas the invention has been particularly described with reference to one embodiment thereof which gives satisfactory results, it will be understood by those skilled in the art to which the invention most nearly appertains that other embodiments or variations thereof may be provided without departing from the spirit or scope of the invention as defined by the appended claims.

I claim:

1. An indicator for use with a calendering machine having first and second spaced means for maintaining pressure on a plurality of calendering rollers and movable in correlation therewith comprising, a beam supported across said machine, a scale centrally located on said beam, first and second indicator arms each pivotally secured to said beam at an opposite end thereof and extending inwardly for registration with said scale, third means responsive to movement of said first means for effecting movement of said first indicator arm, and fourth means responsive to movement of said second means for effecting movement of said second indicator arm.

2. An indicator for use with a calendering machine having first and second spaced levers for maintaining pressure on the spaced end bearings of a plurality of calendering rollers comprising, a beam supported from said machine in substantially parallel relation with said rollers, a vertical scale centrally located on said beam, first and second indicator arms each pivotally secured to said beam at an opposite end thereof and extending inwardly for registration with opposite sides of said scale, first means responsive to movement of said first lever for effecting movement of said first indicator arm, and second means responsive to movement of said second lever for effecting movement of said second indicator arm.

3. Apparatus as set forth in claim 2 wherein each of said indicators is an elongated flat member formed with a main portion and a return-bent portion, and wherein said first and second means each includes a crosshead pivotally secured between the main and return-bent portions of one of said indicator arms, and a rod adjustably secured to said crosshead and depending therefrom for abutment with one of said levers.

4. Apparatus as set forth in claim 2, wherein said beam is formed with an upright backplate having said vertical scale positioned centrally thereon and including a pair of pintles each secured to said backplate at an opposite end thereof for pivotally supporting one of said indicator arms.

5. Apparatus as set forth in claim 4 including a pair of guides, one for each of said indicator arms, each of said guides secured to said beam adjacent said central scale.

6. An indicator for use with a calendering machine having first and second spaced levers for maintaining pressure on the first and second spaced sets, respectively, of end bearings of a plurality of calendering rollers comprising, a beam supported from said machine in substantially parallel relation with the rollers, a vertical scale centrally located on said beam, first and second indicator arms each pivotally secured to said beam at an opposite end thereof and extending inwardly for visual registration with opposite sides of said scale, first means responsive to movement of said first lever for effecting movement of said first indicator arm, and second means responsive to movement of said second lever for effecting movement of said second indicator arm, said first and second means each including a rod pivotally secured to its respective indicator arm and depending therefrom for abutment with its respective lever, the arrangement being such that a small movement of one of said sets of end bearings results in a relatively large movement adjacent said scale of one of said indicator arms.

7. A lap indicator for use with a calendering machine having first and second spaced levers for maintaining pressure on first and second spaced sets, respectively, of end bearings of a plurality of calender rollers through which the lap is adapted to pass in serpentine fashion comprising, a beam supported from said machine in substantially parallel relation with the rollers, said beam formed with an upright backplate having a vertical scale positioned centrally thereon, first and second indicator arms each formed with a main portion and a return-bent portion, a pair of pintles each secured to said backplate at an opposite end thereof for pivotally receiving thereon the main and return-bent portions of one of said indicator arms, the main portion of each of said indicator arms adapted to extend inwardly for visual registration with said vertical scale, a pair of crossheads each pivotally secured between the main and return-bent portions of one of said indicator arms, and a pair of rods each adjustably secured to one of said crossheads and depending therefrom for abutment with one of said levers, the arrangement being such that a movement of one of said sets of end bearings resulting from a change in lap thickness between said rollers effects a multiplied movement adjacent said scale of one of said indicator arms.

References Cited in the file of this patent

UNITED STATES PATENTS

| | | |
|---|---|---|
| 812,042 | Hudson | Feb. 6, 1906 |
| 1,671,737 | Norton | May 29, 1928 |